Nov. 13, 1928.

A. L. BARRETT

ODOMETER

Filed Aug. 6, 1925

1,691,510

Witness
Jas. F. Maloney

Inventor
Albert L. Barrett
by his Attorneys
Van Everen Fish Hildreth Karg

Patented Nov. 13, 1928.

1,691,510

UNITED STATES PATENT OFFICE.

ALBERT L. BARRETT, OF DORCHESTER, MASSACHUSETTS, ASSIGNOR TO STANDARD THERMOMETER COMPANY, OF ROXBURY, MASSACHUSETTS, A CORPORATION OF MAINE.

ODOMETER.

Application filed August 6, 1925. Serial No. 48,477.

The present invention relates to odometers and more particularly to devices for registering both total mileage and trip mileage and embodied in a speedometer of the type conveniently mounted on the dash of a motor vehicle.

In devices of this character, it is usual to provide a manually operated resetting button to reset the trip counter to zero at any desired time, independently of the indication of the total mileage register. This button usually appears at the side of the speedometer, a position which is undesirable not only because it renders the instrument unattractive but also because it makes for considerable expense in that it requires a hole of irregular shape, or two holes, to accommodate both the speedometer and the resetting means.

The object of the present invention is to provide a simple and attractive odometer which will require only one hole for mounting and in which the resetting button may be located within the limits of the casing and preferably symmetrically arranged in the vertical central plane of the instrument. To this end, the invention consists in the odometer hereinafter described and particularly defined in the claim.

Figure 1:
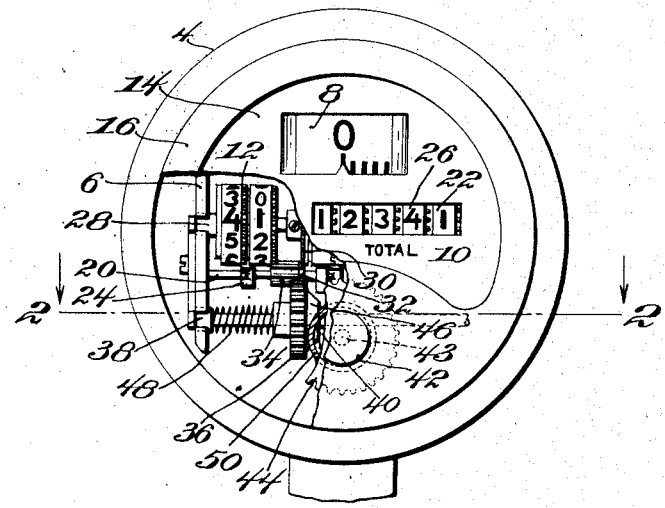
Figures 2, 3:
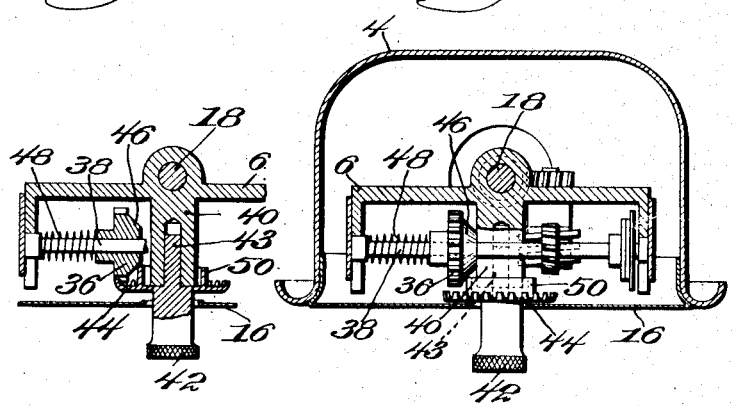

In the accompanying drawings illustrating the preferred form of the invention, Fig. 1 is a front elevation of a speedometer embodying the features of the invention; Fig. 2 is a section on line 2—2 of Fig. 1; and Fig. 3 is a detail view similar to Fig. 2 but showing the resetting means in operation.

The illustrated embodiment of the invention comprises a speedometer having a casing 4, and a frame 6 carrying the speed indicator 8, the total mileage indicator 10 and the trip mileage indicator 12. The various numerals appear through openings in a mask 14 and the entire assembly is retained in the casing by a bezel 16.

A driving shaft 18 which connects with one of the front wheels of the vehicle in the usual manner operates the speed indicator 8 and also communicates through a train of gears with a counter advancing shaft 20 which operates the tenths wheel 22 of the total counter. Loosely mounted on the shaft 20 is a series of counter advancing gears 24, one of which is arranged between successive wheels of both the total and trip counters to advance the wheels in the usual manner. The trip counter is driven through a connection with the total counter and to this end the units wheel 26 of the total counter is operatively connected with the shaft 28 on which both counters are supported, all of the other wheels of both counters being loose on the shaft. A gear 30 secured to the counter supporting shaft meshes with a pinion 32 on the advancing gear shaft 20 and an adjacent pinion 34, also loosely mounted on the shaft, meshes with the gear of the units wheel of the trip counter. An intermediate gear 36 mounted on a shaft 38 normally meshes with both the pinions 32 and 34 so that upon advancement of the units wheel of the total counter a similar advancement of the trip counter will take place. It will be seen that the wheel of the total counter which is secured to the shaft 28 will be in the same numerical order as the lowest wheel of the trip counter. Thus, if a tenths wheel were provided for the trip counter, it would be the tenths wheel of the total counter which would be secured to the shaft.

The means for resetting the trip counter comprises a manually operated member adapted to disengage the intermediate gear 36 from the pinion 32 and to rotate the intermediate gear independently of the total counter. As shown in Figs. 2 and 3, the frame 6 is provided with a projection 40 which constitutes a support for the resetting means and which is disposed in the vertical central plane of the instrument below the horizontal center line. The resetting means comprises a button 42 provided with a reduced portion 43 received in an opening of the support and having a gear 44 formed on an annular flange, this gear 44 being normally out of engagement with the intermediate gear 36. The gear 36 is formed with a cam surface 46, which is normally urged against the support 40 by a coil spring 48, thus maintaining the gear in engagement with both of the pinions 32 and 34. The resetting button has an internal flange or lip 50 which engages with the cam surface 46 of the intermediate gear. In order to effect the setting of the trip counter, the button 42 is depressed, thus moving the gear 36 to the left, as viewed in Fig. 3, by virtue of the engagement of the lip 50 with the cam 46, and bringing the gears 36 and 44 into engagement with each other and at the same time disengaging the gear 36 from the pinion 32. The gear 36, remaining in engagement with the pinion 34, is now effective to cause resetting of the trip counter merely by manual rotation of the button 42. This resetting is entirely independent of any movement of the total register and can be performed while the vehicle is in motion. Upon release of the button 42, the spring 48 moving the intermediate gear to its normal position also forces the resetting button out into its normal position, as shown in Fig. 2, by virtue of the cam action against the lip 50.

I claim—

An odometer having, in combination, a counter supporting shaft, total and trip counters on the shaft, one of the wheels of the total counter being connected to rotate the shaft, an advancing gear shaft, two adjacent pinions loosely mounted on the advancing gear shaft, connections between one of the pinions and the counter supporting shaft, the other pinion connecting with the trip counter, an intermediate gear normally meshing with both of the adjacent gears and having a cam surface, a shaft on which the intermediate gear is mounted, a resetting button having a gear adapted to engage with the intermediate gear and provided with a flange to engage with the cam whereby the intermediate gear may be disengaged from the first of said pinions and rotated independently of the total counter to reset the trip counter.

In testimony whereof I have signed my name to this specification.

ALBERT L. BARRETT.